US010508581B2

(12) United States Patent
Yu

(10) Patent No.: US 10,508,581 B2
(45) Date of Patent: Dec. 17, 2019

(54) MULTI-STEP REGENERATION DEVICE OF DPF AND REGENERATION METHOD THEREFOR

(71) Applicant: DOOSAN CORPORATION, Seoul (KR)

(72) Inventor: Beom Kyun Yu, Incheon (KR)

(73) Assignee: Doosan Corporation, Seoul (KR)

(*) Notice: Subject to any disclaimer, the term of this patent is extended or adjusted under 35 U.S.C. 154(b) by 155 days.

(21) Appl. No.: 14/435,664

(22) PCT Filed: Oct. 14, 2013

(86) PCT No.: PCT/KR2013/009138
§ 371 (c)(1),
(2) Date: Apr. 14, 2015

(87) PCT Pub. No.: WO2014/061946
PCT Pub. Date: Apr. 24, 2014

(65) Prior Publication Data
US 2015/0267589 A1    Sep. 24, 2015

(30) Foreign Application Priority Data
Oct. 16, 2012  (KR) .................. 10-2012-0114884

(51) Int. Cl.
B66F 9/22    (2006.01)
F01N 9/00    (2006.01)
(Continued)

(52) U.S. Cl.
CPC ......... F01N 9/002 (2013.01); B01D 46/0079 (2013.01); B66F 9/22 (2013.01);
(Continued)

(58) Field of Classification Search
CPC .............. B01D 53/944; B01D 53/9409; B01D 53/9495; F01N 3/023; F01N 3/0231;
(Continued)

(56) References Cited

U.S. PATENT DOCUMENTS 4,350,209 A * 9/1982 O'Connor ............ A01B 63/112
172/7
4,719,751 A * 1/1988 Kume .................. F01N 3/0211
60/278
(Continued)

FOREIGN PATENT DOCUMENTS

CN    102383905 A    3/2012
EP    2050970 A2     4/2009
(Continued)

OTHER PUBLICATIONS

International Search Report dated Jan. 16, 2014 with English translation for corresponding International Application No. PCT/KR2013/009138, filed Oct. 14, 2013.
(Continued)

Primary Examiner — Minh Chau T Pham
(74) Attorney, Agent, or Firm — John D. Veldhuis-Kroeze; Westman, Champlin & Koehler, P.A.

(57) ABSTRACT

The present disclosure provides a multi-step regeneration apparatus of a diesel particulate filter (DPF), which generates a load to an engine to remove soot, the apparatus including: an external air temperature sensor configured to measure a temperature of external air; a controller configured to compare a temperature value measured by the external air temperature sensor with a predetermined value and output a signal; and a control valve unit including a first control valve and a second control valve receiving a signal
(Continued)

from the controller, and a first spool operated by the first control valve and a second spool operated by the second control valve.

9 Claims, 3 Drawing Sheets

(51) Int. Cl.
    *F15B 21/00*     (2006.01)
    *F02D 29/04*     (2006.01)
    *B01D 46/00*     (2006.01)
    *F01N 3/023*     (2006.01)

(52) U.S. Cl.
    CPC ........... *F01N 3/0232* (2013.01); *F02D 29/04* (2013.01); *F15B 21/00* (2013.01); *F01N 3/023* (2013.01); *F15B 2211/20523* (2013.01); *F15B 2211/20538* (2013.01); *F15B 2211/20576* (2013.01); *F15B 2211/50518* (2013.01); *F15B 2211/5157* (2013.01); *F15B 2211/611* (2013.01); *F15B 2211/62* (2013.01); *F15B 2211/6343* (2013.01); *F15B 2211/85* (2013.01)

(58) Field of Classification Search
    CPC .... F01N 9/002; F01N 3/0232; F02D 41/0275; F02D 41/029; F02D 2250/36; F02M 26/06; F02M 26/05; B66F 9/22; F15B 2211/20523; F15B 2211/6343; F15B 2211/62; F15B 2211/50518; F15B 2211/611; F15B 2211/85; F15B 2211/5157
    USPC ...... 55/385.3, DIG. 30, DIG. 34; 123/198 E; 60/297, 274; 454/139
    See application file for complete search history.

(56) References Cited

U.S. PATENT DOCUMENTS

| | | | | |
|---|---|---|---|---|
| 5,681,218 A * | 10/1997 | Kishi | ................... | B60H 3/0085 454/139 |
| 5,768,973 A * | 6/1998 | Cochran | ............... | E02F 9/2225 91/516 |
| 2010/0122522 A1 * | 5/2010 | Tsukada | ................... | E02F 9/00 60/284 |
| 2012/0180456 A1 | 7/2012 | Yamada et al. | | |
| 2012/0204542 A1 * | 8/2012 | Norris | ................... | F01N 3/2066 60/274 |
| 2013/0042584 A1 * | 2/2013 | Fujii | ....................... | F01N 3/035 55/282.3 |
| 2013/0111879 A1 * | 5/2013 | Boshart | ................... | F01N 3/031 60/274 |
| 2013/0213010 A1 * | 8/2013 | Zhang | ................... | F01N 3/2013 60/274 |
| 2013/0269321 A1 * | 10/2013 | Watanabe | ............... | F01N 3/208 60/274 |
| 2014/0116027 A1 * | 5/2014 | Ancimer | ............... | F01N 3/2053 60/274 |
| 2014/0216017 A1 * | 8/2014 | Shirai | ................ | B01D 53/9409 60/297 |
| 2015/0135680 A1 * | 5/2015 | Ancimer | ............... | F02D 41/027 60/274 |
| 2015/0149047 A1 * | 5/2015 | Kubota | ................ | E02F 9/2054 701/50 |
| 2015/0337705 A1 * | 11/2015 | Seok | ....................... | F02D 29/04 417/364 |
| 2017/0044960 A1 * | 2/2017 | Naidu | ................. | F02D 41/1446 |
| 2017/0051652 A1 * | 2/2017 | De Smet | ................. | F01N 9/002 |
| 2017/0320483 A1 * | 11/2017 | Ishihara | ................ | B60W 20/16 |

FOREIGN PATENT DOCUMENTS

| | | | | |
|---|---|---|---|---|
| EP | 2423481 A1 * | 2/2012 | ............... | F01N 9/00 |
| JP | 3073380 B2 | 8/2000 | | |
| JP | 2009046998 A | 3/2009 | | |
| JP | 2011137361 A | 7/2011 | | |
| JP | 2011247157 A | 12/2011 | | |
| JP | 2012137042 A | 7/2012 | | |
| JP | 5037570 B2 | 9/2012 | | |
| KR | 10-2012-0015356 A | 2/2012 | | |
| WO | WO 2010/024013 A1 * | 3/2010 | ............... | F01N 3/02 |
| WO | 2011/093400 A1 | 8/2011 | | |

OTHER PUBLICATIONS

Korean Office Action dated Jun. 18, 2018 for Korean Application No. 10-2012-0114884 filed Oct. 16, 2012, 6 pages.
European Search Report dated Jun. 23, 2016 for European Application No. 13847574.4, 10 pages.

* cited by examiner

MULTI-STEP REGENERATION DEVICE OF DPF AND REGENERATION METHOD THEREFOR

CROSS-REFERENCE TO RELATED APPLICATION

This application is a Section 371 National Stage Applications of International Application No. PCT/KR2013/009138, filed Oct. 14, 2013 and published, not in English, as WO 2014/061946A1 on Apr. 24, 2014.

FIELD OF THE DISCLOSURE

The present disclosure relates to a regeneration apparatus and a regeneration method of a DPF of a forklift truck, and more particularly, to a multi-step regeneration apparatus and method of a DPF, which generates a load for each step according to a temperature of external air when actively regenerating the DPF of the forklift truck, thereby preventing the DPF from being overheated.

BACKGROUND OF THE DISCLOSURE

In general, an industrial vehicle, such as a forklift truck, uses a diesel engine, and the large amount of harmful ingredients, such as carbon monoxide, nitrogen oxide, and particulate matter (soot), are included in exhaust gas of the diesel engine. In order to remove harmful materials in the exhaust gas of the diesel engine, a diesel particulate filter (DPF) is provided in a forklift truck, and the DPF refers to an apparatus for filtering and collecting a particulate matter in exhaust gas.

When the particulate matter (PM) or soot is collected in the DPF, a regeneration process is performed in order to remove the collected PM, and the regeneration refers to making the PM collected in the DPF be reacted with oxygen or other oxide materials and be oxidized.

The regeneration includes a passive regeneration method of naturally burning PM of the DPF by using a reaction between carbon, which is a main ingredient of exhaust gas, and nitrogen dioxide at a temperature between 350° C. to 400° C., and an active regeneration method of burning PM by using a direct reaction between carbon, which is a main ingredient of exhaust gas, and oxygen at 550° C. or higher when the DPF is heated at a high temperature during a driving process of an engine.

In order to progress the regeneration, a temperature of exhaust gas needs to be increased through fuel post injection, and when revolutions per minute (RPM) of an engine is small or work has a small load applied to the engine, a temperature of the DPF regeneration apparatus is not increased, thereby resulting in a problem in that the passive regeneration is not performed. Particularly, for a full-size forklift truck, when passive regeneration is not performed at the time the work has a low load, a separate load device needs to be added in order to compulsorily regenerate the DPF.

However, the forklift truck includes a travelling device and a hydraulic device, and it is difficult to compulsorily increase a load in the travelling device, so that an additional configuration for the active regeneration of the DPF by adding a separate hydraulic load device to the hydraulic device is demanded.

Further, when the active regeneration is performed, there is a problem in that when a temperature of external air is high, the DPF is thermally damaged due to overheat after the active regeneration or a melting phenomenon may be incurred.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

According to an exemplary embodiment of the present disclosure, compulsory regeneration is possible by mounting a control valve unit without providing a separate additional load device, and it is possible to prevent an overheat problem by allowing a load to be added for each step according to a temperature of external air.

A multi-step regeneration apparatus of a diesel particulate filter (DPF) according to an exemplary embodiment of the present disclosure includes: an external air temperature sensor 500 configured to measure a temperature of external air; a controller 300 configured to compare a temperature value measured by the external air temperature sensor 500 with a predetermined value and output a signal; and a control valve unit 100 including a first control valve 110 and a second control valve 130 receiving the signal from the controller 300, and a first spool 111 operated by the first control valve 110 and a second spool 131 operated by the second control valve 130.

Further, the multi-step regeneration apparatus may further include a working fluid temperature sensor 510 configured to measure a temperature of working fluid, in which the controller 300 compares a temperature value measured by the working fluid temperature sensor 510 with a predetermined value and outputs a signal.

Further, the control valve unit 100 may further include a first relief valve 150 having a set pressure P1 and a second relief valve 170 having a set pressure P2 positioned at rear ends of the first spool 111 and the second spool 131, and the set pressure P2 of the second relief valve 170 may be larger than the set pressure P1 of the first relief valve 150.

When the temperature value measured by the external air temperature sensor 500 is larger than the predetermined value, the controller 300 may apply a voltage to the first control valve 110 by opening the first spool 111, and a pressure of a working fluid discharged from a main pump may be increased to the pressure P1 while the working fluid passes through the first relief valve.

Further, when the temperature value measured by the external air temperature sensor 500 is smaller than the predetermined value, the controller 300 may apply a voltage to the first control valve 110 and the second control valve 130 to open the first spool 111 and the second spool 131, and the pressure of the working fluid discharged from the main pump may be increased to the Pressure P2 while the working fluid passes through the second relief valve 170.

Further, when the temperature value measured by the working fluid temperature sensor 510 is larger than the predetermined value, the controller 300 may block a voltage applied to the first control valve 110 and the second control valve 130 of the control valve unit 100 to close the control valve unit 100.

Further, a multi-step regeneration method of a DPF according to another exemplary embodiment of the present disclosure includes: measuring a temperature of external air by using an external air temperature sensor 500; comparing, by a controller 300, a temperature value measured by the external air temperature sensor 500 with a predetermined value and outputting a signal; receiving the signal from the controller 300 and selectively controlling a first control valve 110 and a second control valve 130; and selectively increasing, by the first control valve 110 and the second control valve 130, a pressure discharged from a main pump to a set pressure P1 of a first relief valve 150 and a set pressure P2 of a second relief valve 170 by opening a first spool 111 and a second spool 131.

Further, when the temperature value measured by the external air temperature sensor 500 is larger than the predetermined value, the controller 300 may apply a voltage to the first control valve 110 to open the first spool 111, and the pressure of the working fluid discharged from the main pump may be increased to the pressure P1 while the working fluid passes through the first relief valve.

Further, when the temperature value measured by the external air temperature sensor 500 is smaller than the predetermined value, the controller 300 may apply a voltage to the first control valve 110 and the second control valve 130 to open the first spool 111 and the second spool 131, and the pressure of the working fluid discharged from the main pump may be increased to the pressure P2 while the working fluid passes through the second relief valve 170.

According to the exemplary embodiment of the present disclosure, first, it is possible to compulsorily regenerate the DPF with a simple configuration, and second, it is possible to prevent the DPF from being overheated by adjusting the amount of load added according to a temperature of external air.

DETAILED DESCRIPTION

Figure 1:
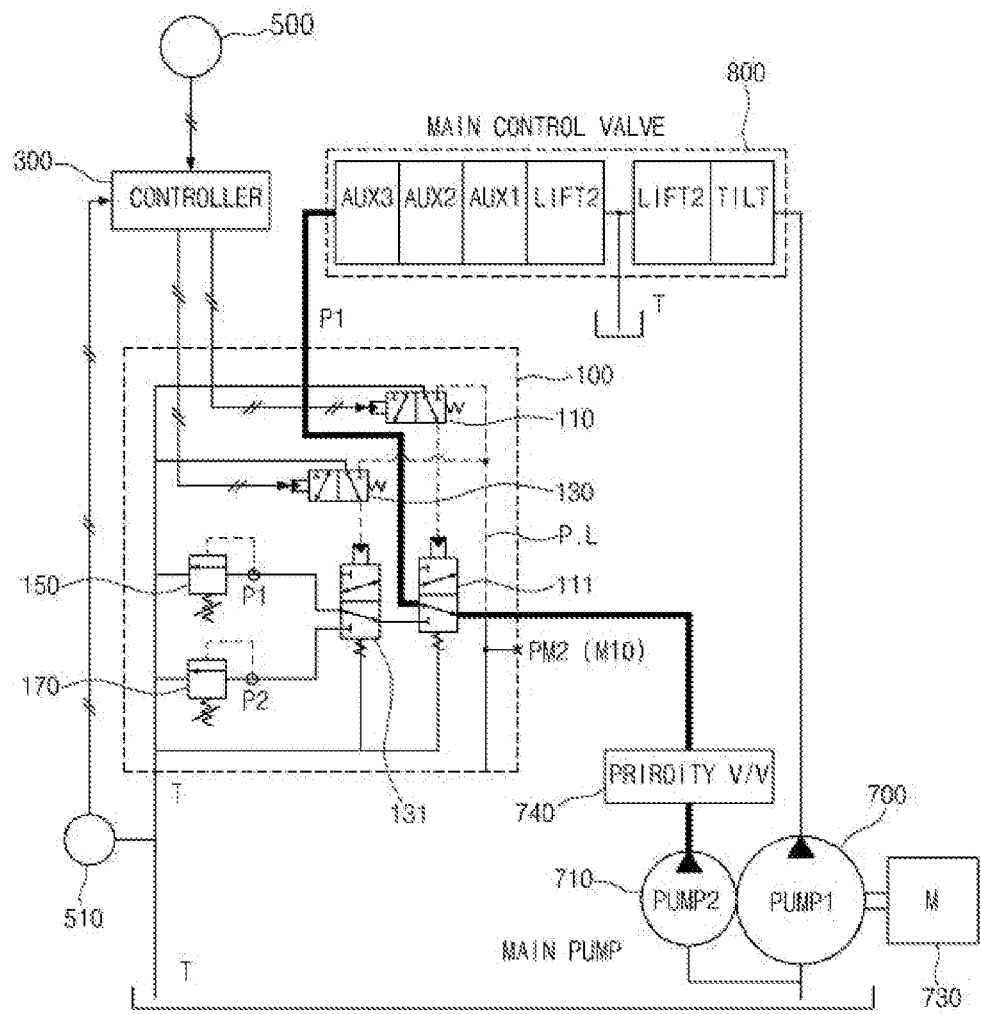
FIG. 1 is a hydraulic circuit diagram illustrating a state where compulsory regeneration is not incurred in a multi-step regeneration apparatus of a DPF according to an exemplary embodiment of the present disclosure.

A multi-step regeneration apparatus and method of a diesel particulate filter (DPF) according to an exemplary embodiment of the present disclosure will be described in detail with reference to the accompanying drawings so as for those skilled in the art to easily carry out the multi-step regeneration apparatus and method of the DPF. The present disclosure is not limited to the exemplary embodiments described herein, and may be implemented into various different forms. A part irrelevant to the description will be omitted to clearly describe the present disclosure, and the same or similar constituent elements will be designated by the same reference numerals throughout the specification.

FIG. 1 illustrates a state where in a compulsory regeneration apparatus according to an exemplary embodiment of the present disclosure, a hydraulic load device (a control valve unit 100) for compulsory regeneration is not operated, so that a flow quantity discharged from a main pump is supplied to a main control valve, and thus a normal operation is possible without a process of compulsory regeneration.

As illustrated in FIG. 1, a multi-step regeneration apparatus of a DPF according to an exemplary embodiment of the present disclosure includes a first main pump 700, a second main pump 710, a pilot pump (not illustrated) for providing a pilot signal pressure, and a motor 730 for driving the pump. That is, the first main pump 700 and the second main ump 710 are driven by the motor 730, and working fluid discharged from the pump enters the main control valve 800 to selectively operate working machinery, such as a lift cylinder or a tilt cylinder.

A control valve unit 100 including a first control valve 110, a second control valve 130, a first spool 111, a second spool 131, and a first relief valve 150, and a second relief valve 170 is provided in the multi-step regeneration apparatus of the DPF according to the exemplary embodiment of the present disclosure.

Further, the multi-step regeneration apparatus of the DPF according to the exemplary embodiment of the present disclosure further includes an external air temperature sensor 500 for measuring a temperature of external air and a working fluid temperature sensor 510 for measuring a temperature of working fluid, and a controller 300 for controlling the control valve according to a signal input from the temperature sensor is additionally provided.

The control valve unit 100 controls the first control valve 110 and the second control valve 130 according to a signal received from the controller 300, and the first control valve 110 and the second control valve 130 operate the first spool 111 and the second spool 131.

Accordingly, a pressure of the working fluid is increased to a pressure set in the first relief valve 150 and the second relief valve 170 while the working fluid discharged from the main pump according to an opening of the first spool 111 and the second spool 131 passes through the first relief valve 150 and the second relief valve 170.

The main control valve 800 illustrated in FIG. 1 is a valve for delivering working fluid to working machinery, such as a tilt cylinder and a lift cylinder, and a driving device for driving various optional devices of the forklift truck, and as illustrated in FIG. 1, when the control valve unit 100 is not operated, all of the working fluid discharged from the main pump enters the main control valve 800, so that the regeneration apparatus normally operate.

The controller 300 may further include a memory unit (not shown) for receiving data from the external air temperature sensor 500 and the working fluid temperature sensor 510 and storing the received data, and further include a controller (not illustrated) for storing predetermined data in the memory unit and comparing a measured value with the stored data.

When it is assumed that a pressure set in the first relief valve 150 is P1, and a pressure set in the second relief valve 170 is P2, P1 may be set to have a value smaller than that of P2, and a pressure of a working fluid passing through the first relief valve 150 is increased to the pressure P1 and a pressure of a working fluid passing through the second relief valve 170 is increased to the pressure P2.

Further, the working fluid output from the main pump may selectively pass through the first relief valve 150 and the second relief valve 170, or the first control valve 110 and the second control valve 130 are operated under the control of the controller 300, so that the working fluid may proportionally pass through the first relief valve 150 and the second relief valve 170 in some cases.

Figure 2:
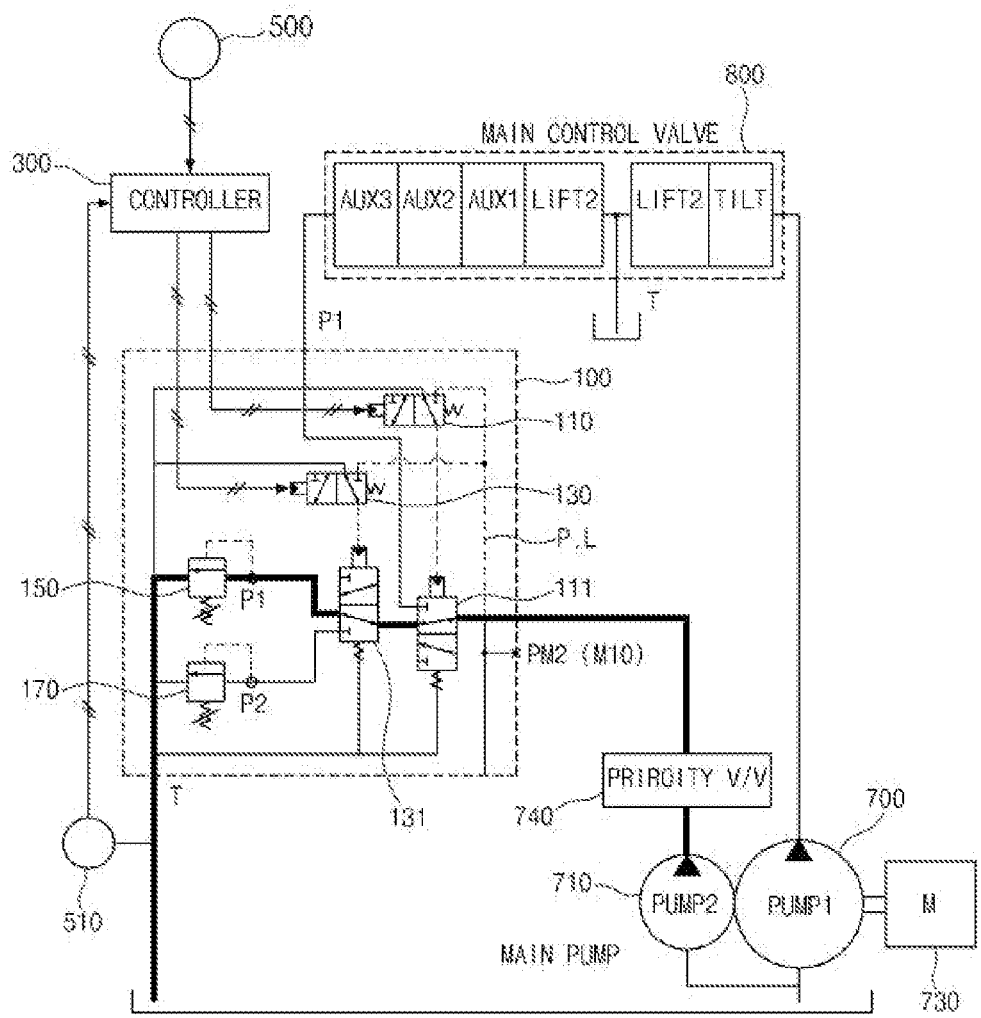
FIG. 2 is a hydraulic circuit diagram illustrating a state where active regeneration at the first step is incurred in a multi-step regeneration apparatus of a DPF according to an exemplary embodiment of the present disclosure.

FIG. 2 illustrates the state where when a value of an external air temperature measured by the external air temperature sensor 500 is larger than a predetermined value according to the exemplary embodiment of the present disclosure, the controller 300 applies a voltage to the first control valve 100 to control the first control valve 110, and the first control valve 110 opens the first spool 111.

Accordingly, the pressure of the working fluid discharged from the main pump according to the opening of the first spool 111 is increased to the pressure P1 while the working fluid passes through the first spool 111 and passes through the first relief valve 150.

In this case, the controller 300 does not apply a voltage to the second control valve 130, so that a first step load is applied to the main pump according to the multi-step regeneration apparatus which is the characteristic of the present disclosure.

The case where the external air temperature measured by the external air temperature sensor 500 is higher than a predetermined reference value may refer to a summer season and a hot season, not a winter season or a cold season, for example, 25° C. or higher, and in this case, there is a high possibility that the DPF is overheated, and thus it is not necessary to largely apply a load to the engine.

Accordingly, P1 that is the set pressure of the first relief valve 150 is smaller than P2 that is the set pressure of the second relief valve 170, so that a relatively small load is generated in the first step to regenerate the DPF.

Figure 3:
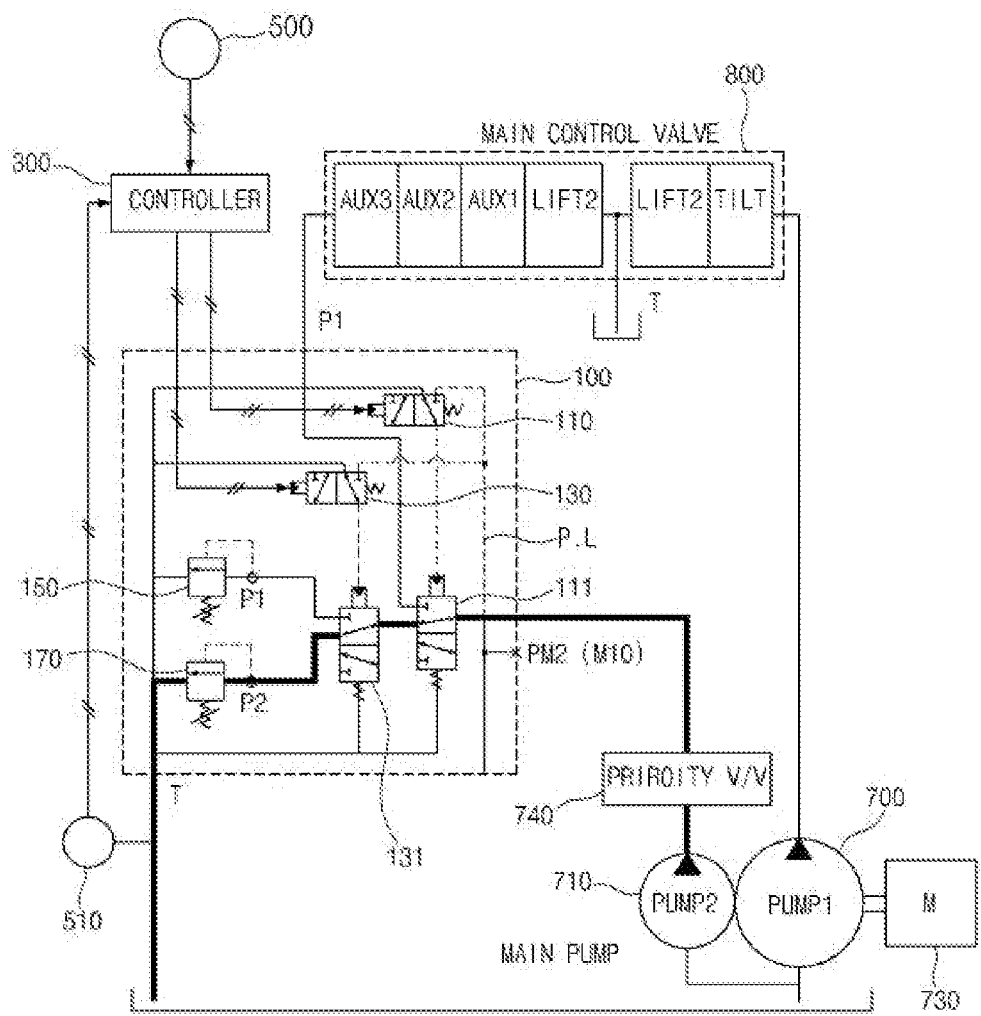
FIG. 3 is a hydraulic circuit diagram illustrating a state where compulsory regeneration at the second step is incurred in the multi-step regeneration apparatus of the DPF according to the exemplary embodiment of the present disclosure.

FIG. 3 is an explanation diagram of a second step of the regeneration apparatus which generates a load when an external air temperature is lower than a predetermined temperature value according to the exemplary embodiment of the present disclosure. That is, when an external air temperature is lower than a predetermined temperature, a possibility that the DPF will be overheated is smaller than at the aforementioned first step of FIG. 2, so that a relative larger load than the load of the first step is applied.

As illustrated in FIG. 3, the controller 300 applies a voltage to both the first control valve 110 and the second control valve 130 to control both the first control valve 110 and the second control valve 130.

Accordingly, both the first spool 111 and the second spool 131 are opened by the first control valve 110 and the second control valve 130, and as illustrated in FIG. 3, the pressure of the working fluid discharged from the main pump is increased to the set pressure P2 while the working fluid passes through the first spool 111 and the second spool 131 and enters the second relief valve 170.

In this case, P2 is larger than P1 that is the set pressure of the first relief valve 150, so that a larger load than the load of the aforementioned first step is generated by the pressure of the working fluid discharged from the main pump.

The case where the external air temperature measured by the external air temperature sensor 500 is lower than a predetermined reference value may refer to a winter season and a cold season, not a summer season or a hot season, for example, 25° C. or lower, and in this case, there is a small possibility that the DPF is overheated, and thus the PM or soot is removed by largely applying a load to the engine.

The multi-step regeneration apparatus of the DPF according to the exemplary embodiment of the present disclosure may further include a working fluid temperature sensor 510 for measuring a temperature of the working fluid, and when a temperature value measured by the working fluid temperature sensor 510 is larger than a predetermined value, the controller 300 may block a signal entering the control valve unit 100, so that all of the working fluid discharged from the main pump enters the main control valve 800, thereby preventing a load from being generated.

That is, it is possible to stably regenerate the diesel engine through a temperature of the working fluid together with the control by an external air temperature by additionally configuring the sensor for measuring the working fluid separately from the external air temperature sensor 500.

A multi-step regeneration method of a DPF according to another exemplary embodiment of the present disclosure includes measuring a temperature of external air by using the external air temperature sensor 500, comparing, by the controller 300, a temperature value measured by the external air temperature sensor 500 and a predetermined value and outputting a signal, receiving the signal from the controller 300 and selectively controlling the first control valve 110 and the second control valve 130, and selectively increasing, by the first control valve 110 and the second control valve 130, a pressure discharged from the main pump to the set pressure P1 of the first relief valve 150 and the set pressure P2 of the second relief valve 170 by opening the first spool 111 and the second spool 131.

When the temperature value measured by the external air temperature sensor 500 is larger than the predetermined value, the controller 300 applies a voltage to the first control valve 110 to open the first spool 111, and the fluid of the working fluid discharged from the main pump is increased to the pressure P1 while the working fluid passes through the first relief valve.

The case where the external air temperature measured by the external air temperature sensor 500 is higher than a predetermined reference value may refer to a summer season and a hot season, not a winter season or a cold season, for example, 25° C. or higher, and in this case, there is a high possibility in that the DPF is overheated, and thus it is not necessary to largely apply a load to the engine.

When the temperature value measured by the external air temperature sensor 500 is smaller than the predetermined value, the controller 300 applies a voltage to the first control valve 110 and the second control valve 130 to open the first spool 111 and the second spool 131, and the pressure of the working fluid discharged from the main pump is increased to the pressure P2 while the working fluid passes through the second relief valve 170.

The case where the external air temperature measured by the external air temperature sensor 500 is lower than a predetermined reference value may refer to a winter season and a cold season, not a summer season or a hot season, for example, 25° C. or lower, and in this case, there is a small possibility that the DPF is overheated, and thus the PM or soot is removed by largely applying a load to the engine.

The present disclosure is not limited to the specific exemplary embodiment, and various modifications may be carried out by those skilled in the art to which the present disclosure pertains without departing from a principal matter defined in the claims of the present disclosure, and the modifications belong to the scope of the description of the claims.

DESCRIPTION OF MAIN REFERENCE NUMERALS OF THE DRAWINGS

| | |
|---|---|
| 100: Control valve unit | 110: First control valve |
| 111: First spool | 130: Second control valve |
| 131: Second spool | 150: First relief valve |
| 170: Second relief valve | 300: Controller |
| 500: External air temperature sensor | |
| 510: Working fluid temperature sensor | |
| 700: First main pump | 710: Second main pump |
| 730: Motor | 740: Priority valve |
| 800: Main control valve | P.L: Pilot line |
| P1: First relief pressure | P2: Second relief pressure |

The invention claimed is:

1. A multi-step regeneration apparatus of a diesel particulate filter (DPF), which generates a load to an engine to remove soot, the apparatus comprising:
   an external air temperature sensor configured to measure a temperature of external air;
   a controller configured to compare an external air temperature value measured by the external air temperature sensor with a predetermined value and output a signal; and
   a control valve unit, which is a hydraulic load device, including a first control valve and a second control valve receiving the signal from the controller, and a first spool operated by the first control valve and a second spool operated by the second control valve;
   wherein the control valve unit further includes a first relief valve having a set pressure (P1) and a second relief valve having a set pressure (P2) positioned at rear ends of the first spool and the second spool;
   wherein the control valve unit selectively applies the output signal to one or more of the first control valve and the second control valve based on whether the external air temperature value is greater than or less than the predetermined value so as to generate at least two different hydraulic load levels.

2. The multi-step regeneration apparatus of claim 1, further comprising:
   a working fluid temperature sensor configured to measure a temperature of a working fluid of the hydraulic load device,
   wherein the controller compares a temperature value measured by the working fluid temperature sensor with a predetermined value and outputs a signal.

3. The multi-step regeneration apparatus of claim 1, wherein the set pressure (P2) of the second relief valve is larger than the set pressure (P1) of the first relief valve.

4. The multi-step regeneration apparatus of claim 3, wherein when the temperature value measured by the external air temperature sensor is larger than the predetermined value, the controller applies a voltage to the first control valve to open the first spool, and a pressure of a working fluid of the hydraulic load device discharged from a main pump is increased to the pressure (P1) while the working fluid passes through the first relief valve.

5. The multi-step regeneration apparatus of claim 3, wherein when the temperature value measured by the external air temperature sensor is smaller than the predetermined value, the controller applies a voltage to the first control valve and the second control valve to open the first spool and the second spool, and the pressure of a working fluid discharged of the hydraulic load device from a main pump is increased to the pressure (P2) while the working fluid passes through the second relief valve.

6. The multi-step regeneration apparatus of claim 2, wherein when the temperature value measured by the working fluid temperature sensor is larger than the predetermined value, the controller blocks a voltage applied to the first control valve and the second control valve of the control valve unit to close the control valve unit.

7. A multi-step regeneration method of a diesel particulate filter (DPF), which generates a load to an engine to remove soot, the method comprising:
   measuring a temperature of external air by using an external air temperature sensor;
   comparing, by a controller, a temperature value measured by the external air temperature sensor with a predetermined value and outputting a signal;
   receiving the signal from the controller and selectively controlling one or more of a first control valve and a second control valve of a hydraulic load device based on whether the external air temperature value is greater than or less than the predetermined value; and
   selectively increasing, by the one or more of the first control valve and the second control valve, a pressure discharged from a main pump to a set pressure (P1) of a first relief valve and a set pressure (P2) of a second relief valve by selectively opening one or more of a first spool and a second spool so as to generate at least two different hydraulic load levels and prevent overheating.

8. The multi-step regeneration method of claim 7, wherein when the temperature value measured by the external air temperature sensor is larger than the predetermined value, the controller applies a voltage to the first control valve to open the first spool, and the pressure of a working fluid of the hydraulic load device discharged from the main pump is increased to the pressure (P1) while the working fluid passes through the first relief valve.

9. The multi-step regeneration method of claim 7, wherein when the temperature value measured by the external air temperature sensor is smaller than the predetermined value, the controller applies a voltage to the first control valve and the second control valve to open the first spool and the second spool, and the pressure of a working fluid of the hydraulic load device discharged from the main pump is increased to the pressure (P2) while the working fluid passes through the second relief valve.

* * * * *